Sept. 10, 1968      N. G. FOLEY      3,400,766
HOUSED ROTARY AGITATOR FOR SMOTHERING FIRES
Filed July 1, 1965
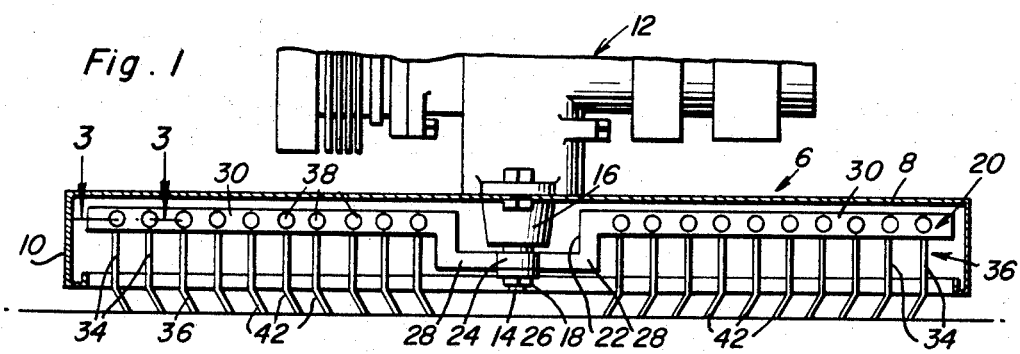
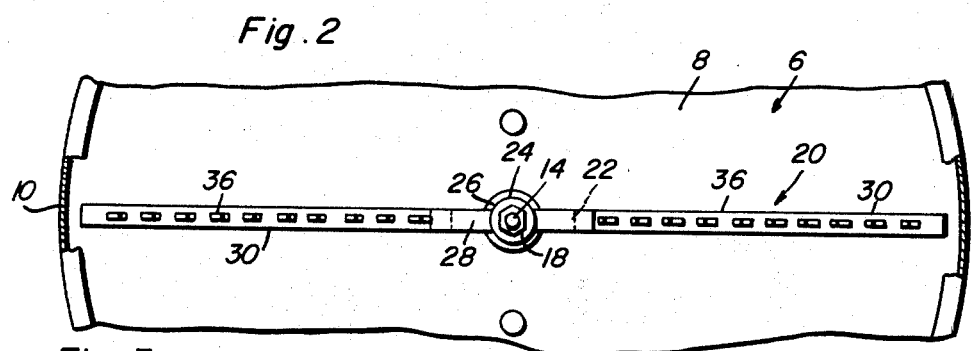
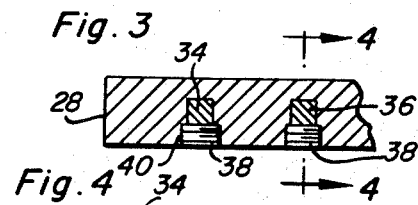
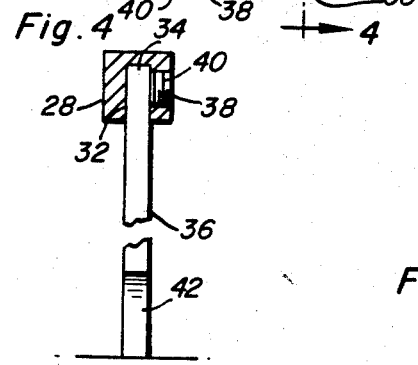
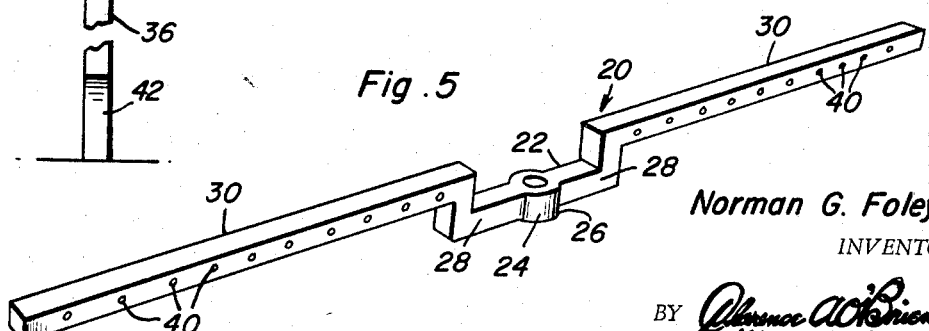
Norman G. Foley
INVENTOR.

United States Patent Office 3,400,766
Patented Sept. 10, 1968

3,400,766
HOUSED ROTARY AGITATOR FOR
SMOTHERING FIRES
Norman G. Foley, Rte. 1, Box 14,
Matoaka, W. Va. 24736
Filed July 1, 1965, Ser. No. 468,755
2 Claims. (Cl. 172—111)

ABSTRACT OF THE DISCLOSURE

A ready-to-use attachment. Can be substituted for cutter blade on a rotary power mower. Detach the blade and bolt the attachment in place. Comprises rigid bar having depending U-shaped adapter (attachable to mower's shaft) and elevated coplanar limbs whirlable in orbital path just beneath top of blade housing and which carry distributed tines having offset claws below skirt of housing which (1) dig in and (2) claw the earth and flammable underbrush with force necessary to beat out the fire.

---

The present invention relates to a manually maneuverable and steerable device which is structurally similar to currently usable power driven lawn mowers and which embodies built-in means which is capably adapted to assist a walking fire fighter to cope with and eradicate fire; that is, a portion thereof, in a forest, wooded or so-called open area.

Mobile wheel-supported and equivalent land vehicles have been devised by others in this field of endeavor to assist volunteer fire fighters and others to diminish and lessen the spread of a raging fire in a wooded area, field or the like. With the character of the herein disclosed invention in view it will be evident that Poon's portable fire fighting equipment Patent No. 2,884,075 and likewise the fire smothering push along vehicle disclosed in Murphy's Patent No. 2,449,311 are exemplary, generally speaking, of the state of the art to which the invention relates.

With the above information serving as an informative background, it is to be pointed out that the concept herein under advisement constitutes and provides a more realistic and efficient solution of the problem in that a portable housing is equipped with a power unit whose shaft projects into the axial or hub portion of the housing where it is connected with a driven horizontal bar or an equivalent member the purpose of which is to act on the burning or flaming growth, underbrush, earth and the entrapped air and to violently whirl, disintegrate and extinguish it as the mixture is cast centrifugally beyond the rim of the housing.

To the ends desired the means employed comprises not only a horizontal bar centrally attached and similar to the rotary cutting bar on a power lawn mower but which is expressly designed and adapted to achieve the result desired in that it is provided at longitudinally spaced points with depending tines or fingers which constitute and provide churning and agitating beaters capable of beating out the fire along the path traversed by the device.

In carrying out a preferred embodiment of the invention the bar is made in the form of an attachment, that is, an attachment which can be substituted for the customary cutter blade on a rotary power mower simply by detaching said blade and using the fire fighting bar attachment in lieu thereof.

More explicitly, the present invention pertains to a rigid whirlable bar having a U-shaped central attaching portion which can be bolted on the motor driven shaft and having outstanding coplanar arms which rotate close to the plane at the end of each side of the housing and which are provided with sockets and setscrews which function to mount detachable and replaceable beater fingers or tines on said bar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view showing a portion of a motor or power operated unit, similar to a power lawn mower, and wherein the usual blade thereon has been removed and replaced by the attachment constituting the improvement herein under advisement.

FIGURE 2 is a fragmentary bottom plan view with portions of the rim broken away.

FIGURE 3 is an enlarged detail section taken on the plane of the section line 3—3 of FIGURE 1.

FIGURE 4 is a section at right angles taken on the plane of the section line 4—4 of FIGURE 3.

And FIGURE 5 is a view in perspective of the readily attachable and detachable beater bar by itself.

With reference now to FIGURES 1 and 2, and particularly FIGURE 1, the numeral 6 designates a circular or equivalent power unit housing which, generally construed, may be compared to a power lawn mower housing. It comprises a horizontal top 8 marginally provided with a depending annular or similar wall or confining skirt 10. The numeral 12 designates a suitable power unit which may be a motor, preferably an internal combustion engine. The motor driven shaft 14 depends into the central or hub portion of the housing 6 where it is associated with and depends below the bearing or hub 16 and is provided with a blade assembling and attaching nut or the like 18. It will be understood that the component parts now being described are being set forth in relationship to a power lawn mower. On the other hand it should be clear that the concept involves a power unit and for this reason it is desired to construe the invention either as (1) a power operated fire fighting device or, alternatively, as (2) an attachment which makes it possible to remove the usual cutter blade and convert a power lawn mower into a fire fighting device. In either event, the means which is directly capable of acting on the burning undergrowth, bushes and small trees, takes the form of an attachment, more particularly, the attachment shown in FIGURE 5 and denoted, as a unit, by the numeral 20. This unit comprises a sturdy metal or equivalent bar which is horizontally elongated. The bar has a central substantially U-shaped offset or depending portion 22 characterized by a bight 24 with a bearing or hub 26 and with lateral end portions 28, the latter, being joined to a pair of elongated coplanar outstanding elevated limbs or arms 30 which are the same in construction, that is, to the left and right of the hub. Each arm or limb is provided as shown in FIGURES 3 and 4 with open bottom sockets 32 to accommodate the insertable and removable upper end portions 34 of the finger-like tines 36. These tines are held in place by setscrews 38 plugged and screwed into screw-threaded holes 40 provided therefor in the bar. The lower depending ends are laterally bent or deflected to provide hooks or claws 42.

It will be evident that the tines or fingers constitute agitating and whirlable beaters. The central U-shaped portion of the bar functions to adapt the bar to functioning use on the motor driven shaft 14 and is held in place by the usual nut means 18. With this construction the limbs 30 are not only in a plane with each other but assume positions close beneath and sweep in an orbital path parallel to the bottom of the top wall 8 of the housing 6. The bar has as many sockets, setscrews and claw-like beating fingers are desired. In the event that one beater or finger is broken it can be easily replaced. Also by having the limbs or arms 30 elevated they can sweep around in a path above rough objects such as stones, brush, hard dirt and so on.

It will be clear that it is an objective of the fire fighter bar to provide means which is capable of use on present-day lawn mowers and under the circumstances by removing the regular cutting blade and substituting the attachment shown in the views of the drawing the lawn mower is made ready for fire fighting purposes. The beating fingers are sturdy but could be slightly yieldable but are intended to be closely spaced to create as much air disturbance as possible within the confines of the housing with the claws depending below the housing and ripping loose dirt, undergrowth and debris and disintegrating it with the fire extinguishing result desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable device adapted to assist a fire fighter to eradicate and extinguish a fire in a forest, wooded or open area comprising a hollow mobile housing having a horizontal top and depending marginal skirt similar to the cutter blade housing in use on present power operated lawn mowers, a shaft supported for rotation on and depending axially into the hub portion of said housing, a power unit operatively mounted on said top and operatively joined to and functioning to rotate said shaft, and means operable within the encompassing confines of said housing and constructed and uniquely adapted to whirlably churn and beat entrapped flaming underbrush and debris in a manner to disintegrate and extinguish the fire therein, said means comprising a horizontally elongated rigid bar of a length that it spans the space of the hollow portion of said housing, said bar provided at its center with a depending U-shaped part the bight of which is provided with an apertured hub which is separably but operatively bolted to said shaft and which includes a pair of diametrically opposite outstanding coplanar arms which are elevated and are rotatable in an orbital path parallel and close to the underneath side of the top wall of said housing, each arm being provided with a plurality of depending rigid tines providing beaters and having lower terminal end portions which are oblique angled and accordingly laterally offset, said offset terminals being structurally and functionally alike, being confined to the path of rotation below said open bottom, and all of said terminals being angularly toed toward said U-shaped part and providing claws capable of loosening, disintegrating and assisting in centrifugally agitating, whirling and cleaning the flammable debris and underbrush in a manner to expedite extinguishing the thus agitated fire.

2. For use on and in conjunction with the usual power driven blade operating shaft of a power operated lawn mower, a replacement blade adapted to be substituted for the usual shaft driven blade and comprising a horizontally elongated bar of a length that it is adapted to span the space of the hollow portion of the mower housing, said bar being provided at its center with a U-shaped adapter, said adapter having a bight portion which is provided with an apertured hub which is designed and adapted to be separably but operatively mounted on the lower end of the aforementioned shaft, said bar also embodying a pair of diametrically opposite outstanding coplanar arms which are capable of rotation in an orbital path in close proximity to an underneath side of the top wall of the aforementioned housing, each arm being provided with a plurality of depending rigid tines, said bar being rigid and noncircular in cross-section and having a flat underneath side provided with noncircular downwardly opening sockets, one accessible vertical side of each arm having setscrews aligned with their respectively cooperable sockets, a plurality of rigid tine-like beater fingers having noncircular upper ends plugged conformingly and rigidly into their respective sockets and being securely fastened therein by cooperating setscrews, said fingers being wholly located beneath said arms, said fingers having lower terminal end portions which are oblique angled and are thus laterally offset, said offset terminals being structurally and functionally alike, confined to a path of rotation below the open bottom of the aforementioned mower housing, said terminals being angularly toed toward each other and intervening U-shaped part and providing a multiplicity of rigid claws, said claws being capable of loosening, disintegrating and centrifugally agitating, whirling and clearing the flammable underbrush and debris in a manner to extinguish the fire.

References Cited
UNITED STATES PATENTS

| | | | |
|---|---|---|---|
| 304,130 | 8/1884 | Renfroe | 169—1 |
| 903,394 | 11/1908 | Mikolasek | 169—1 |
| 2,936,563 | 5/1960 | Blume | 239—222.11 |
| 3,117,633 | 1/1964 | Hosek | 172—96 X |
| 3,169,583 | 2/1965 | Thurow | 172—111 |
| 3,246,458 | 4/1966 | Lavergne | 56—25.4 |

ABRAHAM G. STONE, *Primary Examiner.*

J. R. OAKS, *Assistant Examiner.*